July 14, 1925.

W. O. HACKER

CLUTCH PULLEY

Filed Feb. 1, 1923

1,546,233

Inventor
William O. Hacker,

By
Attorney

Patented July 14, 1925.

1,546,233

UNITED STATES PATENT OFFICE.

WILLIAM O. HACKER, OF ENTRICAN, MICHIGAN.

CLUTCH PULLEY.

Application filed February 1, 1923. Serial No. 616,307.

*To all whom it may concern:*

Be it known that WILLIAM O. HACKER, a citizen of the United States of America, residing at Entrican, in the county of Montcalm and State of Michigan, has invented new and useful Improvements in Clutch Pulleys, of which the following is a specification.

The object of the invention is to provide a comparatively simple and efficient and at the same time powerful clutch pulley and more particularly to provide a double clutch pulley wherein multiplied efficiency in the matter of grip is afforded to guard against slippage under load; and at the same time to provide a device of this type wherein the elements are readily available when required for adjustment or repair; and with these objects in view the invention consists in a construction and combination of parts of which a preferred embodiment is shown in the accompanying drawings, wherein:—

Figure 1:
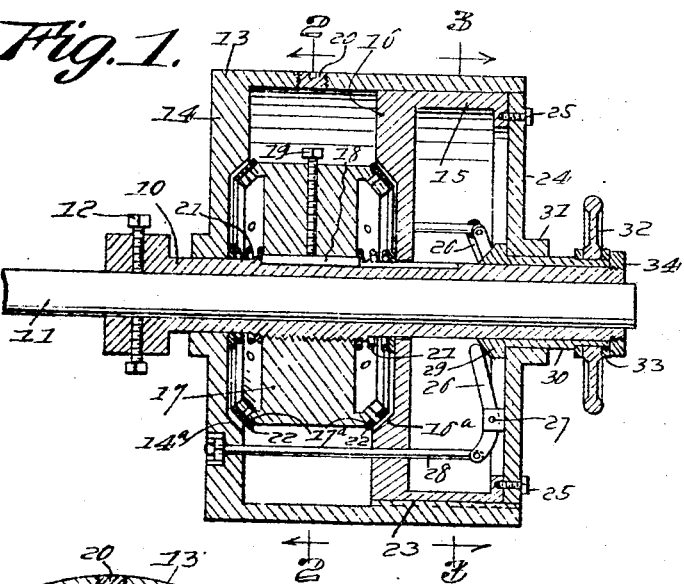

Figure 1 is a longitudinal sectional view of a clutch pulley embodying the invention.

Figure 2:
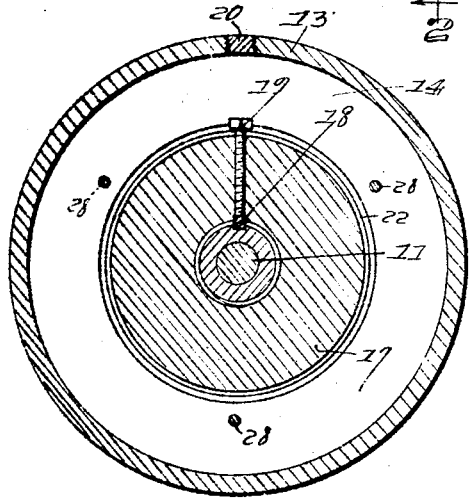
Figure 3:
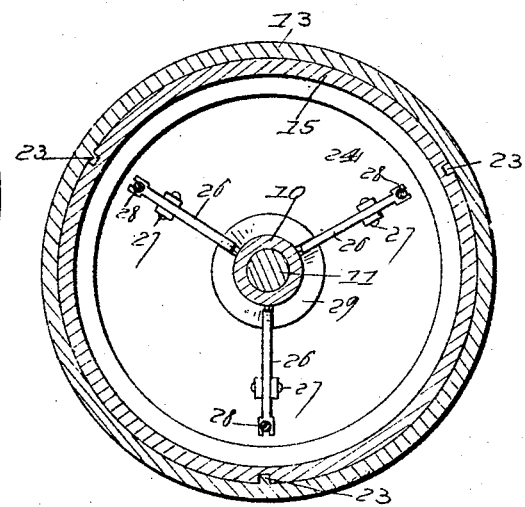

Figures 2 and 3 are transverse sectional views of the same taken respectively on the planes indicated by the lines 2—2 and 3—3 of Figure 1.

One of the objects of the invention is to provide a clutch pulley which may be applied as a unit to a shaft and may be applied to a stub shaft as well as to a line shaft with the minimum of preparation and loss of time, and to this end it embodies a sleeve 10 which is adapted to be fitted on the shaft 11 and to be secured thereto by any suitable fastening means such as the set-screws 12. This sleeve carries all of the elements of the clutch pulley including the drum 13 which is revolubly mounted on the sleeve and is provided with one of the clutch heads 14, the follower 15 which is fitted for axial movement in the drum and carries the other clutch head 16, and the core 17 which is threaded upon and keyed to the sleeve and is provided with clutch faces complemental to those carried by the clutch heads for locking the drum to the sleeve.

The key 18 which serves as a locking means to prevent rotation of the core 17 on the sleeve and hence to lock said core to the shaft, is preferably secured against displacement by a set-screw 19 which is accessible through the shell of the drum by means of a removable plug 20. The clutch heads which are provided with clutch faces 14$^a$ and 16$^a$ for engagement with the clutch faces 17$^a$ of the core, are movable both revolubly and axially or longitudinally of the sleeve and are yieldingly held in released or inoperative relation with the core by means of expansion springs 21 in opposition to which said heads must be moved in order to effect their engagement with the clutch faces. The clutch faces of the core are preferably provided with friction faces 22.

The follower 15 is keyed in the shell of the drum as shown at 23 so as to permit of relative sliding movement thereof, and prevent relative rotary movement, the outer end of said follower being fitted with a disk 24 which is removable from the body of the follower and is secured in place by means of cap screws 25. Within the housing or cavity afforded by the follower are arranged levers 26 fulcrumed at 27 and connected by draw rods 28 with the clutch head 14. The free ends of these levers bear upon the faces of the cam 29, which faces are formed by beveling the edge of the cam, so that the bevels defining each face have their center lines oblique to the circumferential line of the cam. Obviously, with this arrangement, relative angular movement between the disk 24 and the cam will result in rocking the levers 26 and the actuation of the parts to engage or release the clutch elements. To provide for the actuation of the cam, it is formed as an integral part of the sleeve 30 rotatably mounted in the hub 31 through which the sleeve protrudes and is fitted with a hand wheel 32 and secured in proper position on the sleeve 30 between the rings 33. The sleeve 30 and the outer of the rings 33 abut a ring 34 secured to the extremity of the sleeve 10, as by threads.

Having described the invention, what is claimed as new and useful is:—

A clutch pulley comprising a sleeve, a drum mounted upon the sleeve for angular and axial movement on the latter, a follower enclosed by the drum and keyed to the latter to preclude relative angular movement but permit relative axial movement, said drum and follower having opposed clutch heads, a core secured to the sleeve between said clutch heads and provided with clutch faces complemental to the clutch faces of said heads, a collar mounted for angular movement on the sleeve and provided interiorly of the follower with a cam and exteriorly thereof with a hand wheel, pivoted levers carried by the follower and having their one end bearing upon the cam, and draw rods connecting the opposite ends of the levers with the drum.

In testimony whereof he affixes his signature.

WILLIAM O. HACKER.